US012683705B2

(12) United States Patent
Guo et al.

(10) Patent No.: US 12,683,705 B2
(45) Date of Patent: Jul. 14, 2026

(54) OPTICAL SIGNAL AMPLIFICATION APPARATUS AND METHOD

(71) Applicant: Huawei Technologies Co., Ltd., Shenzhen (CN)

(72) Inventors: Qiang Guo, Shenzhen (CN); Rui Zhou, Shenzhen (CN); Xiaofan Ji, Tianjin (CN); Lin Zhang, Tianjin (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 18/493,273

(22) Filed: Oct. 24, 2023

(65) Prior Publication Data

US 2024/0056210 A1     Feb. 15, 2024

Related U.S. Application Data

(63) Continuation of application No. PCT/CN2022/084789, filed on Apr. 1, 2022.

(30) Foreign Application Priority Data

Apr. 25, 2021     (CN) .......................... 202110450172.9

(51) Int. Cl.
| | | |
|---|---|---|
| *H04J 14/02* | (2006.01) | |
| *H04B 10/079* | (2013.01) | |
| *H04J 14/04* | (2006.01) | |

(52) U.S. Cl.
CPC .. *H04J 14/02216* (2023.08); *H04B 10/07955* (2013.01); *H04J 14/04* (2013.01)

(58) Field of Classification Search
CPC ...... H04J 14/02216; H04J 14/04; H04J 14/05;
H04J 14/052; H04J 14/02; H04B 10/07955; H04B 10/2581; H04B 10/564; H04B 10/2916; H01S 3/06754; H01S 3/06783; H01S 3/094003; H01S 3/094007; H01S 3/094069; H01S 3/13013; H01S 3/094096; H01S 3/2391; H01S 3/10015
See application file for complete search history.

(56) References Cited

U.S. PATENT DOCUMENTS

| | | | | |
|---|---|---|---|---|
| 2003/0137720 A1* | 7/2003 | Onaka | ................. | H01S 3/13013 |
| | | | | 359/334 |
| 2012/0262780 A1* | 10/2012 | Bai | ................... | H01S 3/094069 |
| | | | | 359/337.11 |

(Continued)

*Primary Examiner* — Hibret A Woldekidan
(74) *Attorney, Agent, or Firm* — Conley Rose, P.C.

(57) ABSTRACT

An optical signal amplification apparatus includes a power detection module, a pump control module, and a Raman amplification module. The power detection module is configured to detect power of each of a plurality of G wavelength channels in each of a plurality of N spatial dimensions, and send power configuration information to the pump control module. The pump control module is configured to output N channels of pump light, where each channel of pump light includes M pieces of split pump light of different wavelengths, and a proportion of each piece of split pump light in pump light of a corresponding wavelength is determined based on the power configuration information. The Raman amplification module is configured to perform Raman amplification on a space division multiplexed signal in all of the N spatial dimensions by using the N channels of pump light.

20 Claims, 7 Drawing Sheets

1000

Detect power of each of G wavelength channels in N spatial dimensions to obtain power detection information, and determine power configuration information based on the power detection information ~~ S1010

Output N channels of pump light, where each channel of pump light includes M pieces of split pump light of different wavelengths, and a proportion of each piece of split pump light in pump light of a corresponding wavelength is determined based on the power configuration information ~~ S1020

Perform Raman amplification on a space division multiplexed signal in all of the N spatial dimensions by using the N channels of pump light ~~ S1030

(56) References Cited

U.S. PATENT DOCUMENTS

| | | | |
|---|---|---|---|
| 2015/0085352 A1* | 3/2015 | Ryf | H01S 3/094007 |
| | | | 359/341.1 |
| 2015/0229098 A1* | 8/2015 | Tsuzuki | H04B 10/564 |
| | | | 359/334 |

* cited by examiner

1000

OPTICAL SIGNAL AMPLIFICATION APPARATUS AND METHOD

CROSS-REFERENCE TO RELATED APPLICATIONS

This is a continuation of International Patent Application No. PCT/CN2022/084789 filed on Apr. 1, 2022, which claims priority to Chinese Patent Application No. 202110450172.9 filed on Apr. 25, 2021. The disclosures of the aforementioned applications are hereby incorporated by reference in their entireties.

TECHNICAL FIELD

This application relates to the optical communications field, and more specifically, to an optical signal amplification apparatus and method.

BACKGROUND

With the rapid growth of network traffic in recent years, a capacity of a conventional single-mode fiber communications system is gradually approaching its theoretical transmission limit. Improvement of conventional single-mode fiber communications transmission technologies cannot satisfy network traffic growth. This causes a capacity crisis of conventional single-mode fiber communications systems. Using a few-mode fiber (FMF) and a multi-core fiber (MCF) as transmission media of a space-division multiplexing (SDM) system is expected to greatly increase a capacity of an optical fiber communications system, and is considered as an effective way to resolve the capacity crisis.

A few-mode/multi-core fiber amplifier is an important component in a long-distance SDM transmission system. A few-mode/multi-core fiber amplifier can implement simultaneous amplification for channels with different modes/fiber cores. With the expansion of a quantity of signal modes/fiber cores, a conventional few-mode/multi-core fiber amplifier cannot achieve good signal gain flatness. This greatly affects transmission performance of a system.

SUMMARY

This application provides an optical signal amplification apparatus and method, to achieve comparatively good gain flatness, thereby helping improve transmission performance of a system, and greatly increasing a transmission distance.

According to a first aspect, an optical signal amplification apparatus is provided, and is applied to a space division multiplexing transmission system. A to-be-detected space division multiplexed signal in the space division multiplexing transmission system includes N spatial dimensions, and each spatial dimension includes G wavelength channels, where N is a positive integer, and G is a positive integer. The optical signal amplification apparatus includes a power detection module, a pump control module, and a Raman amplification module.

The power detection module is configured to: detect power of each of the G wavelength channels in each of the N spatial dimensions to obtain power detection information; determine power configuration information based on the power detection information; and send the power configuration information to the pump control module. The pump control module is configured to output N channels of pump light, where each channel of pump light includes M pieces of split pump light of different wavelengths, and a proportion of each piece of split pump light in pump light of a corresponding wavelength is determined based on the power configuration information. The Raman amplification module is configured to perform Raman amplification on the space division multiplexed signal in all of the N spatial dimensions by using the N channels of pump light.

The N channels of pump light correspond to the N spatial dimensions, to provide corresponding pump light for the space division multiplexed signal in each spatial dimension, to perform Raman amplification and power equalization on the space division multiplexed signal. The optical signal amplification apparatus in this embodiment of this application improves transmission performance of the space division multiplexing system, and greatly increases a transmission distance.

In a possible implementation, the pump control module includes M pump light sources of different wavelengths, M optical splitters, and N optical multiplexers. Each optical splitter has one input port and N output ports. Each pump light source is connected to an input port of one optical splitter. N output ports of each optical splitter are connected to one output port in the N optical multiplexers. The M pump light sources are configured to generate M pieces of pump light. Each optical splitter is configured to split pump light of a corresponding wavelength based on a first splitting coefficient, and output N pieces of split pump light through N output ports. The N pieces of split pump light output by each optical splitter arrive at the N optical multiplexers, respectively. The N optical multiplexers are configured to output the N channels of pump light. Each optical multiplexer is configured to perform, based on a second splitting coefficient, beam combining on M pieces of split pump light obtained from the M optical splitters, to obtain one channel of pump light. The first splitting coefficient and/or the second splitting coefficient are/is determined based on the power configuration information.

It can be understood that a splitting coefficient corresponding to power of the N channels of pump light output by the pump control module is determined based on the power configuration information. The splitting coefficient corresponding to the power of the N channels of pump light may be adjusted in the following two stages: a first stage in which the optical splitter splits pump light of each wavelength, and a second stage in which the optical multiplexer performs beam combining on a plurality of pieces of split pump light. The pump control module may obtain the N channels of pump light (or adjust the splitting coefficient in the foregoing two stages) by using different implementations. For ease of description, the first splitting coefficient (corresponding to the first stage) and the second splitting coefficient (corresponding to the second stage) are introduced for description.

In an implementation, the M optical splitters are tunable optical splitters, and a first splitting coefficient corresponding to each tunable optical splitter is determined based on the power configuration information. Herein, a function of the power configuration information is embodied in each tunable optical splitter, and only simple weighted summation needs to be performed on the M pieces of split pump light at the optical multiplexer. In this case, correspondingly, the second splitting coefficient is a weighting coefficient (or a weight value), and a value of each weighting coefficient is 1.

In another implementation, the M optical splitters are uniform optical splitters, a first splitting coefficient corresponding to each uniform optical splitter is determined by equally splitting pump light of a corresponding wavelength, and the second splitting coefficient is determined based on the power configuration information. Herein, the pump light of the corresponding wavelength merely needs to be equally split at the uniform optical splitter, and a function of the power configuration information is embodied in the optical multiplexer.

Optionally, the N optical multiplexers implement the second splitting coefficient by using a wavelength selective switch or an optical cross-connect device.

In still another implementation, both the first splitting coefficient and the second splitting coefficient are determined based on the power configuration information. In other words, a function of the power configuration information is embodied in both the optical splitter and the optical multiplexer.

Through the foregoing different implementations, the pump control module can dynamically adjust gains of different channels in different spatial dimensions, to compensate for a differential mode gain (DMG) generated after signal light passes through an erbium-doped fiber amplifier (EDFA), thereby implementing gain equalization of different channels in different spatial dimensions.

In a possible implementation, that the power detection module is configured to determine power configuration information based on the power detection information includes: the power detection module determines the power configuration information based on the power detection information according to a power flatness criterion.

Before performing detection on each wavelength channel, the power detection module may first separate each spatial dimension, and further separate each wavelength channel in each spatial dimension.

In a possible implementation, the power detection module includes a spatial channel separation module and a wavelength channel power detection module. The spatial channel separation module is configured to separate the space division multiplexed signal in the N spatial dimensions. The wavelength channel power detection module is configured to separate the G wavelength channels in each spatial dimension, and detect the power of each wavelength channel.

For example, the spatial channel separation module is a space division demultiplexer.

For example, the wavelength channel power detection module is a wavelength demultiplexer.

In a possible implementation, the optical signal amplification apparatus further includes a first optical splitter, the first optical splitter is configured to separate the to-be-detected space division multiplexed signal from a space division multiplexing fiber link, and the first optical splitter is connected to the power detection module.

In a possible implementation, the Raman amplification module includes a space division multiplexer and a space division multiplexing fiber. The N channels of pump light are coupled to the space division multiplexing fiber through the space division multiplexer, and the space division multiplexed signal transmitted in the space division multiplexing fiber undergoes stimulated Raman amplification under the action of the N channels of pump light.

In a possible implementation, the optical signal amplification apparatus is applied to a few-mode fiber transmission system (for example, a few-mode fiber C+L-band transmission system), and the optical signal amplification apparatus further includes N phase plates. The N phase plates are disposed between the pump control module and the Raman amplification module. The N phase plates are configured to load, to corresponding modes, the N channels of pump light output by the pump control module, where the N spatial dimensions are N modes. The optical signal amplification apparatus in this embodiment of this application is applied to the few-mode fiber transmission system, and can compensate for gains at different channels in different modes, thereby implementing mode channel equalization of the few-mode fiber transmission system.

In a possible implementation, the optical signal amplification apparatus is applied to a multi-core fiber transmission system, and the optical signal amplification apparatus further includes a multi-core fan-in module. The multi-core fan-in module is disposed between the pump control module and the Raman amplification module. The multi-core fan-in module is configured to inject, into corresponding fiber cores, the N channels of pump light output by the pump control module, where the N spatial dimensions are N fiber cores. The optical signal amplification apparatus in this embodiment of this application is applied to the multi-core fiber transmission system, and can compensate for gains at different channels with different fiber cores, thereby implementing multi-core equalization.

According to a second aspect, an optical signal amplification method is provided. The method is performed by an optical signal amplification apparatus. The optical signal amplification apparatus is applied to a space division multiplexing transmission system. A to-be-detected space division multiplexed signal in the space division multiplexing transmission system includes N spatial dimensions, and each spatial dimension includes G wavelength channels, where N is a positive integer, and G is a positive integer. The method includes: detecting power of each of the G wavelength channels in each of the N spatial dimensions to obtain power detection information, and determining power configuration information based on the power detection information; outputting N channels of pump light, where each channel of pump light includes M pieces of split pump light of different wavelengths, and a proportion of each piece of split pump light in pump light of a corresponding wavelength is determined based on the power configuration information; and performing Raman amplification on the space division multiplexed signal in all of the N spatial dimensions by using the N channels of pump light. The optical signal amplification method in this embodiment of this application improves transmission performance of the space division multiplexing system, and greatly increases a transmission distance.

In a possible implementation, the M pieces of split pump light in each channel of pump light are obtained through beam combining based on a second splitting coefficient, and each piece of split pump light is obtained by splitting pump light of a corresponding wavelength based on a first splitting coefficient. The first splitting coefficient and/or the second splitting coefficient are/is determined based on the power configuration information.

It can be understood that a splitting coefficient corresponding to power of the N channels of pump light is determined based on the power configuration information. The splitting coefficient corresponding to the power of the N channels of pump light may be adjusted in the following two stages: a first stage in which an optical splitter splits pump light of each wavelength, and a second stage in which an optical multiplexer performs beam combining on a plurality of pieces of split pump light. A pump control module may obtain the N channels of pump light (or adjust the splitting coefficient in the foregoing two stages) by using different implementations. For ease of description, the first splitting coefficient (corresponding to the first stage) and the second splitting coefficient (corresponding to the second stage) are introduced for description.

In a possible implementation, the determining power configuration information based on the power detection information includes: determining the power configuration information based on the power detection information according to a power flatness criterion.

In a possible implementation, the optical signal amplification apparatus is applied to a few-mode fiber transmission system (for example, a few-mode fiber C+L-band transmission system), and the method further includes: loading the N channels of pump light to corresponding modes, where the N spatial dimensions are N modes. The optical signal amplification apparatus in this embodiment of this application is applied to the few-mode fiber transmission system, and can compensate for gains at different channels in different modes, thereby implementing mode channel equalization of the few-mode fiber transmission system.

In a possible implementation, the optical signal amplification apparatus is applied to a multi-core fiber transmission system, and the method further includes: injecting the N channels of pump light into corresponding fiber cores, where the N spatial dimensions are N fiber cores. In other words, the optical signal amplification method in this embodiment of this application is applied to the multi-core fiber transmission system, and can compensate for gains at different channels with different fiber cores, thereby implementing multi-core equalization.

According to a third aspect, a computer-readable storage medium is provided, and is configured to store a computer program. The computer program includes instructions used to perform the method according to any one of the second aspect or the possible implementations of the second aspect.

DESCRIPTION OF EMBODIMENTS

The following describes technical solutions in this application with reference to accompanying drawings.

For ease of understanding embodiments of this application, first, terms used in this application are briefly described.

1. Space Division Multiplexing (SDM)

Space division multiplexing is a manner of implementing multiplexing through space division. For example, a plurality of optical fibers is combined into a bundle to implement space division multiplexing, or space division multiplexing is implemented in one optical fiber.

2. Few-Mode Fiber (FMF)

A few-mode fiber is a single-core fiber. Compared with a common single-mode fiber, a few-mode fiber has a comparatively large mode field area, and allows parallel data stream transmission in several independent spatial modes, thereby increasing a system communication capacity.

3. Few-Mode Erbium-Doped Fiber Amplifier (FM-EDFA)

A few-mode erbium-doped fiber amplifier is an active optical device in which a few-mode fiber is doped with a trace of erbium ions and pump light is injected to cause population inversion of the erbium ions, so that stimulated emission occurs when few-mode signal light passes through the fiber, thereby amplifying the signal light.

4. Differential Mode Gain (DMG)

A differential mode gain is a difference between gains obtained in an optical amplifier in all modes of a few-mode fiber.

5. Mode-Dependent Loss (MDL)

A mode-dependent loss means that transmission in a few-mode fiber in different modes has different transmission losses.

A few-mode/multi-core fiber amplifier is an important component in a long-distance SDM transmission system. At present, gain flatness between channels of a few-mode/multi-core fiber amplifier is comparatively poor, which seriously affects transmission performance of a system. In addition, an FM-EDFA has an excessively complex structure, and therefore cannot be deployed in a network.

A few-mode fiber amplifier is used as an example. An excessively high DMG of a few-mode fiber amplifier may cause an increase in a mode-dependent loss MDL of a mode division multiplexing system at repeater amplification. In a long-distance transmission system, after transmission through a plurality of spans, a probability of system interruption greatly increases due to MDL accumulation. This greatly affects transmission performance.

Based on this, this application proposes an optical signal amplification apparatus and method, to help improve transmission performance, and greatly increase a transmission distance.

The technical solutions in embodiments of this application are applied to an optical communications system, for example, a space division multiplexing transmission system, a few-mode fiber transmission system, or a multi-core fiber transmission system.

Figure 1:
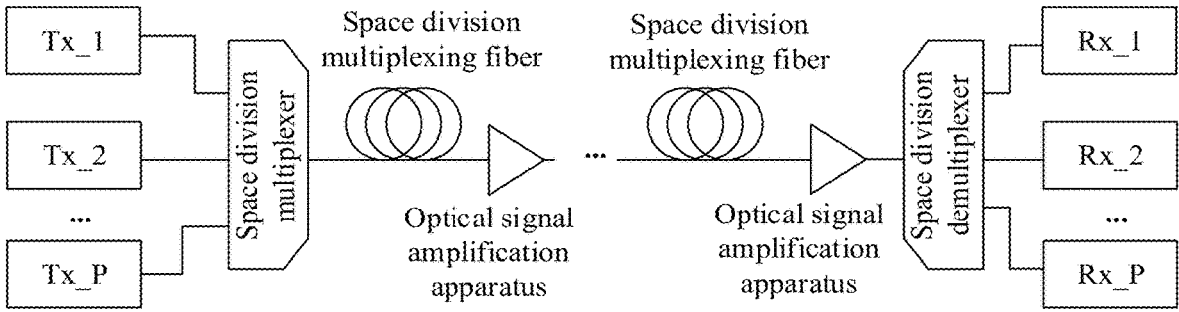
FIG. 1 is a schematic diagram of a space division multiplexing transmission system to which embodiments of this application are applied.

FIG. 1 is a schematic diagram of a space division multiplexing transmission system to which embodiments of this application are applied. As shown in FIG. 1, the system includes P wavelength division multiplexing transmitters (for example, the P wavelength division multiplexing transmitters are represented as Tx_1, Tx_2, . . . , and Tx_P), a space division multiplexer, a space division multiplexing fiber, a plurality of optical signal amplification apparatuses, a space division demultiplexer, and P wavelength division multiplexing receivers (for example, the P wavelength division multiplexing receivers are represented as Rx_1, Rx_2, . . . , and Rx_P). The plurality of wavelength division multiplexing transmitters is connected to the space division multiplexer. The plurality of wavelength division multiplexing receivers is connected to the space division demultiplexer. The space division multiplexer is connected to the space division multiplexing fiber. The optical signal amplification apparatus is cascaded with the space division multiplexing fiber.

Wavelength division multiplexed optical signals generated by the plurality of wavelength division multiplexing transmitters are converted into different spatial dimensions through the space division multiplexer. Optical signals multiplexed by the space division multiplexer enter the space division multiplexing fiber for transmission. The signals transmitted through the space division multiplexing fiber enter the optical signal amplification apparatus. The optical signal amplification apparatus amplifies the signals transmitted from the space division multiplexing transmission fiber, and inputs amplified optical signals to a next segment of fiber for transmission, and then the amplified optical signals are amplified again. At a receive end, the space division demultiplexer separates space division multiplexed optical signals received from the optical signal amplification apparatus, and respectively inputs the separated optical signals to the plurality of wavelength division multiplexing receivers. The wavelength division multiplexing receivers demodulate the received optical signals.

The optical signal amplification apparatus in FIG. 1 is the optical signal amplification apparatus proposed in this application, and can compensate for power unflatness of wavelength channels in different spatial dimensions, thereby helping improve transmission performance, and implementing long-distance transmission.

The following describes the optical signal amplification apparatus in embodiments of this application with reference to FIG. 2 to FIG. 9.

Figure 2:
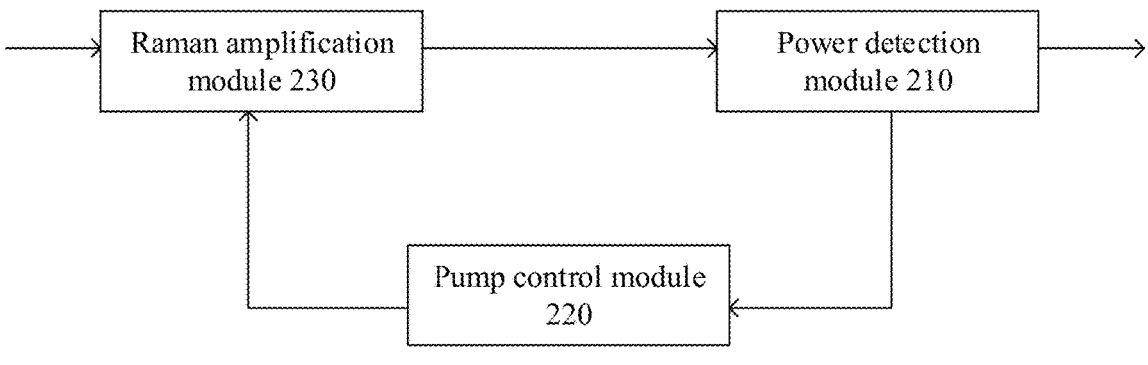
FIG. 2 is a schematic block diagram of an optical signal amplification apparatus according to an embodiment of this application.

FIG. 2 is a schematic block diagram of an optical signal amplification apparatus according to an embodiment of this application. As shown in FIG. 2, the optical signal amplification apparatus includes a power detection module 210, a pump control module 220, and a Raman amplification module 230. The optical signal amplification apparatus is applied to a space division multiplexing transmission system. A to-be-transmitted space division multiplexed signal in the space division multiplexing transmission system includes N spatial dimensions, and each spatial dimension includes G wavelength channels, where N is a positive integer, and G is a positive integer. For example, the spatial dimension may include a mode or a fiber core.

The power detection module 210 is configured to: detect power of each of the G wavelength channels in each of the N spatial dimensions to obtain power detection information; determine power configuration information based on the power detection information; and send the power configuration information to the pump control module.

The pump control module 220 is configured to output N channels of pump light, where each channel of pump light includes M pieces of split pump light of different wavelengths, a proportion of each piece of split pump light in pump light of a corresponding wavelength is determined based on the power configuration information, and M is an integer greater than 1.

The Raman amplification module 230 is configured to perform Raman amplification on the space division multiplexed signal in all of the N spatial dimensions by using the N channels of pump light.

In this embodiment of this application, the power detection module 210 detects the power of each wavelength channel in each spatial dimension, to obtain the power detection information (or power distribution information) of each wavelength channel in each spatial dimension, then performs calculation by using the power detection information, to obtain the power configuration information, and feeds back the power configuration information to the pump control module 220. The pump control module 220 is configured to output the N channels of pump light, where each channel of pump light includes M pieces of split pump light of different wavelengths, and a proportion of each piece of split pump light in pump light of a corresponding wavelength is determined based on the power configuration information. In other words, the pump control module 220 adjusts a splitting proportion of pump light of each wavelength based on the power configuration information, so that a pump configuration corresponding to each channel of output pump light is consistent with the power configuration information fed back by the power detection module. The Raman amplification module 230 is configured to perform Raman amplification on the space division multiplexed signal by using the N channels of pump light output by the pump control module. Further, the N channels of pump light correspond to the N spatial dimensions, to provide corresponding pump light for the space division multiplexed signal in each spatial dimension, to perform Raman amplification and power equalization on the space division multiplexed signal. The optical signal amplification apparatus in this embodiment of this application improves transmission performance of the space division multiplexing system, and greatly increases a transmission distance.

It should be understood that an arrow direction in FIG. 2 is merely an example for description, and does not constitute a limitation on this embodiment of this application.

Optionally, that the power detection module 210 is configured to determine power configuration information based on the power detection information includes: the power detection module determines the power configuration information based on the power detection information according to a power flatness criterion. The power flatness criterion may be understood as a criterion for ensuring power equalization of all wavelength channels in each spatial dimension.

The power detection module 210 detects the power of each wavelength channel in each spatial dimension in real time, determines the power configuration information according to the power flatness criterion, and feeds back the power configuration information to the pump control module 220, so that the pump control module 220 dynamically adjusts a splitting coefficient of each channel of pump light.

The power configuration information is used to implement power equalization between spatial wavelength channels. For example, the power configuration information may include one or more target power values. The target power value may be understood as a power compensation value for a wavelength channel in a spatial dimension.

A process in which the power detection module determines the power configuration information is described by using an example. It is assumed that the space division multiplexed signal transmitted in the space division multiplexing system has a plurality of spatial dimensions, and one of the spatial dimensions includes five wavelength channels. The power detection module may obtain a power value of each wavelength channel by performing detection on the five wavelength channels. To implement power equalization or power flattening, a power value of a wavelength channel whose power value is comparatively small in the five wavelength channels may be adjusted up, and a power value of a wavelength channel whose power value is comparatively large may be adjusted down, that is, a power value in the five wavelength channels is adjusted to the target power value. It can be understood that the example herein is merely for ease of understanding, and this application is not limited thereto. For example, a quantity of wavelength channels is not limited. It can be further understood that the example is given herein for a plurality of wavelength channels in only one spatial dimension, but during actual application, this may be extended to wavelength channels in a plurality of spatial dimensions. This is not specifically limited.

Before performing detection on each wavelength channel, the power detection module 210 may first separate each spatial dimension, and further separate each wavelength channel in each spatial dimension. Further, separation of the space division multiplexed signal in the N spatial dimensions may be implemented by using a spatial channel separation module (for example, a space division demultiplexer). Further, the G wavelength channels may be separated by using a wavelength channel power detection module (for example, a wavelength demultiplexer).

Optionally, the power detection module 210 may include the spatial channel separation module and the wavelength channel power detection module. The spatial channel separation module is configured to separate the space division multiplexed signal in the N spatial dimensions. The wavelength channel power detection module is configured to separate the G wavelength channels in each spatial dimension, and detect the power of each wavelength channel.

For example, the spatial channel separation module may be implemented by a space division demultiplexer. It can be understood that this application is not limited thereto, and spatial channel separation may be alternatively implemented by using another device or module having a spatial channel separation function.

For example, the wavelength channel power detection module may be implemented by a wavelength demultiplexer. It can be understood that this application is not limited thereto, and wavelength channel separation and/or detection may be alternatively implemented by using another device or module having a wavelength channel separation function and/or detection function.

Optionally, the power detection module 210 may further include a data collection and processing module. The data collection and processing module is configured to collect and process data output by the wavelength channel power detection module.

Figure 3:
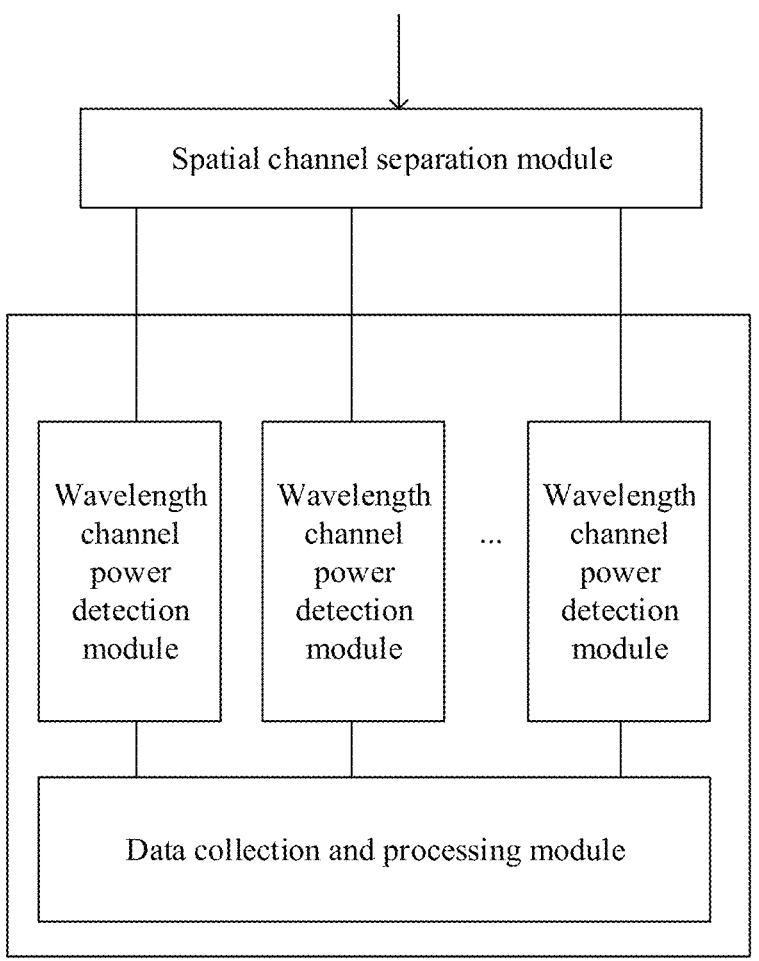
FIG. 3 is an example diagram of a power detection module according to an embodiment of this application.

FIG. 3 is an example diagram of a power detection module. As shown in FIG. 3, the power detection module includes a spatial channel separation module, a plurality of wavelength channel power detection modules, and a data collection and processing module. The spatial channel separation module demultiplexes light in different spatial dimensions, to separate data in the spatial dimensions. The wavelength channel power detection module is configured to detect a power value of each wavelength channel in each spatial dimension. After an output of the plurality of wavelength channel power detection modules is processed by the data collection and processing module, power configuration information is output. The power detection module feeds back the power configuration information to a pump control module, to adjust splitting coefficients that are allocated by M pump light sources to the N spatial dimensions. For example, the splitting coefficients are represented as $(a_1, a_2, \ldots, a_M, \ldots, k_1, k_2, \ldots, k_M)$.

A source of the to-be-detected space division multiplexed signal is not specifically limited in this application. The space division multiplexed signal detected by the power detection module 210 (that is, the to-be-detected space division multiplexed signal) may be partial signal light separated from a fiber link by using an optical splitting apparatus (for example, an optical splitter).

Optionally, the optical signal amplification apparatus further includes a first optical splitter. The first optical splitter is configured to separate the to-be-detected space division multiplexed signal from a space division multiplexing fiber link. The first optical splitter is connected to the power detection module. The power detection module performs detection on the partial signal light separated by the first optical splitter, to obtain a power status of each wavelength channel in each spatial dimension.

In this embodiment of this application, the pump control module 220 is configured to adjust a pump light splitting coefficient by using the power configuration information obtained from the power detection module 210, to output the N channels of pump light. The following briefly describes the pump control module 220.

Optionally, the pump control module 220 includes M pump light sources of different wavelengths, M optical splitters, and N optical multiplexers. Each optical splitter has one input port and N output ports. Each pump light source is connected to an input port of one optical splitter. N output ports of each optical splitter are connected to one output port in the N optical multiplexers. The M pump light sources are configured to generate M pieces of pump light. Each optical splitter is configured to split pump light of a corresponding wavelength based on a first splitting coefficient, and output N pieces of split pump light through N output ports. The N pieces of split pump light output by each optical splitter arrive at the N optical multiplexers, respectively. The N optical multiplexers are configured to output the N channels of pump light. Each optical multiplexer is configured to perform, based on a second splitting coefficient, beam combining on M pieces of split pump light obtained from the M optical splitters, to obtain one channel of pump light. The first splitting coefficient and/or the second splitting coefficient are/is determined based on the power configuration information.

The pump light source is configured to generate pump light. For example, the pump light source may be implemented by a pump laser.

It can be understood that the pump laser is merely one possible implementation thereof, and this application is not limited thereto. A person skilled in the art may replace the pump laser with another apparatus that can generate pump light. For example, a 980 nanometer (nm) laser diode may be used as the pump light source.

The M pump light sources of the different wavelengths are configured to generate the M pieces of pump light of the different wavelengths. It is assumed that the wavelengths corresponding to the M pieces of pump light are represented as $\lambda_1, \lambda_2, \ldots,$ and $\lambda_M$, and output powers corresponding to the pump light of the wavelengths are represented as $P_{\lambda 1}$, $P_{\lambda 2}, \ldots,$ and $P_{\lambda M}$. In this case, a power of pump light output by each optical multiplexer is a weighted sum of powers of M pieces of split pump light. For example, a pump power of an optical multiplexer 1 is $a_1 P_{\lambda 1} + a_2 P_{\lambda 2} + \ldots a_M P_{\lambda M}$, where $a_i P_{\lambda i}$ is a pump power corresponding to a wavelength $\lambda_i$ after optical splitting, . . . , and a pump power of an optical multiplexer N is $k_1 P_{\lambda 1} + k_2 P_{\lambda 2} + \ldots k_M P_{\lambda M}$. In other words, powers of the N channels of pump light output by the N optical multiplexers may be represented as $(a_1 P_{\lambda 1} + a_2 P_{\lambda 2} + \ldots a_M P_{\lambda M}, \ldots, k_1 P_{\lambda 1} + k_2 P_{\lambda 2} + \ldots k_M P_{\lambda M})$. Splitting coefficients corresponding to the powers of the N channels of pump light may be represented as $(a_1, a_2, \ldots, a_M, \ldots, k_1, k_2, \ldots, k_M)$.

In this embodiment of this application, the splitting coefficient corresponding to the power of the N channels of pump light output by the pump control module 220 is determined based on the power configuration information. The splitting coefficient corresponding to the power of the N channels of pump light may be adjusted in the following two stages: a first stage in which the optical splitter splits pump light of each wavelength, and a second stage in which the optical multiplexer performs beam combining on a plurality of pieces of split pump light. The pump control module may obtain the N channels of pump light (or adjust the splitting coefficient in the foregoing two stages) by using different implementations. For ease of description, the first splitting coefficient (corresponding to the first stage) and the second splitting coefficient (corresponding to the second stage) are introduced for description.

Implementation 1:

The first splitting coefficient is determined based on the power configuration information. The pump control module 220 allocates a pump light power of a corresponding wavelength to N output ports of a tunable optical splitter based on the first splitting coefficient by using the tunable optical splitter. In other words, the pump control module determines the first splitting coefficient based on the power configuration information, and adjusts the tunable optical splitter based on the first splitting coefficient.

In the implementation 1, a function of the power configuration information is embodied in each tunable optical splitter, and only simple weighted summation needs to be performed on the M pieces of split pump light at the optical multiplexer. In this case, correspondingly, the second splitting coefficient is a weighting coefficient (or a weight value), and a value of each weighting coefficient is 1.

Further, the pump control module 220 includes the M pump light sources of the different wavelengths ($\lambda_1$, $\lambda_2$, . . . , $\lambda_M$), the M tunable optical splitters, and the N optical multiplexers. Each optical splitter has one input port and N optical-splitting output ports. The input port is connected to one pump light source of a specific wavelength. A splitting proportion of the N output ports (that is, the first splitting coefficient) may be adjusted based on the power configuration information. The N pieces of split pump light output by each optical splitter arrive at the N optical multiplexers, respectively. Each optical multiplexer obtains split pump light output by all of the M optical splitters, that is, M pieces of split pump light. Each optical multiplexer is configured to perform, based on the second splitting coefficient, beam combining on the M pieces of split pump light obtained from the M optical splitters, to obtain one channel of pump light. In other words, an output of each optical multiplexer is a weighted sum of powers of the M pieces of split pump light (where the weighting coefficient is 1).

The first splitting coefficient generally refers to a splitting coefficient (or splitting proportion) adjusted by using the optical splitter. In addition, values of first splitting coefficients respectively corresponding to different optical splitters may be the same or may be different. This is not specifically limited in this application. A first splitting coefficient corresponding to one optical splitter may include one or more values. This is not limited.

For example, a pump power of an optical multiplexer 1 is a $a_1P_{\lambda 1}+a_2P_{\lambda 2}+$ . . . $a_MP_{\lambda M}$, where $a_iP_{\lambda i}$ is a pump power corresponding to a wavelength $\lambda_i$ after optical splitting, . . . , and a pump power of an optical multiplexer N is $k_1P_{\lambda 1}+k_2P_{\lambda 2}+$ . . . $k_MP_{\lambda M}$. Correspondingly, a first splitting coefficient corresponding to an optical splitter 1 is $(a_1, . . . , k_1)$, and a first splitting coefficient corresponding to an optical splitter M is $(a_M, . . . , k_M)$.

Figure 4:
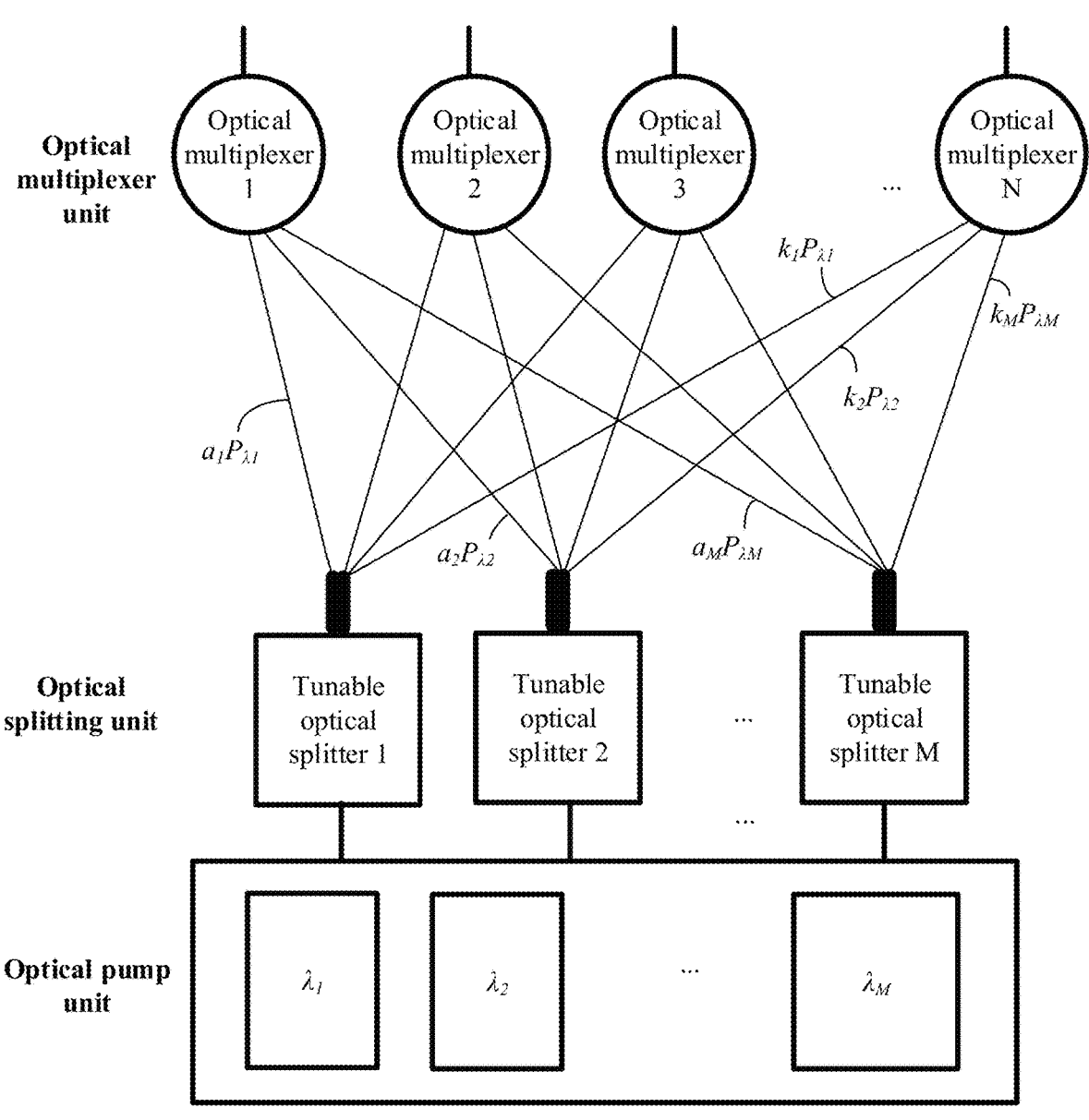
FIG. 4 is an example diagram of a pump control module according to an embodiment of this application.

For ease of understanding, the pump control module corresponding to the implementation 1 is described herein with reference to FIG. 4. For ease of description, an optical pump unit, an optical splitting unit, and an optical multiplexer unit are introduced herein. As shown in FIG. 4, the pump control module includes three parts: the optical pump unit, the optical splitting unit, and the optical multiplexer unit. The optical pump unit includes M pump lasers of different wavelengths ($\lambda_1$, $\lambda_2$, . . . , $\lambda_M$). The optical splitting unit includes M tunable optical splitters. Each optical splitter has one input port and N optical-splitting output ports. The input port is connected to one pump laser of a specific wavelength. A splitting proportion of the N output ports may be adjusted at will. The optical multiplexer unit includes N optical multiplexers. Each optical multiplexer performs beam combining on powers of pump light of the M wavelengths obtained through optical splitting, that is, an output of each optical multiplexer is a weighted sum of the powers of the pump light of the M wavelengths. For example, a pump light power output by an optical multiplexer 1 is $a_1P_{\lambda 1}+a_2P_{\lambda 2}+$ . . . $a_MP_{\lambda M}$, . . . , and a pump light power output by an optical multiplexer N is $k_1P_{\lambda 1}+k_2P_{\lambda 2}+$ . . . $k_MP_{\lambda M}$.

Implementation 2:

The second splitting coefficient is determined based on the power configuration information. The pump control module adjusts a proportion of split pump light of each wavelength at the optical multiplexer by using the second splitting coefficient, and finally outputs the N channels of pump light. In other words, the pump control module determines the second splitting coefficient based on the power configuration information, and performs beam combining on split pump light of different wavelengths based on the second splitting coefficient.

In the implementation 2, the pump light of the corresponding wavelength merely needs to be equally split at the uniform optical splitter, and a function of the power configuration information is embodied in the optical multiplexer.

Further, the pump control module includes the M pump light sources of the different wavelengths ($\lambda_1$, $\lambda_2$, . . . , $\lambda_M$), the M uniform optical splitters, and the N optical multiplexers. Each optical splitter has one input port and N optical-splitting output ports. The input port is connected to one pump light source of a specific wavelength. Each optical splitter splits a power of pump light of a corresponding wavelength into N equal parts, to obtain N pieces of split pump light whose powers are the same. The N pieces of split pump light output by each optical splitter arrive at the N optical multiplexers, respectively. Each optical multiplexer obtains split pump light output by all of the M uniform optical splitters, that is, M pieces of split pump light. Each optical multiplexer is configured to perform, based on the second splitting coefficient, beam combining on the M pieces of split pump light obtained from the M optical splitters, to obtain one channel of pump light. In other words, an output of each optical multiplexer is a weighted sum of powers of the M pieces of split pump light (where a weighting coefficient used for weighting is the second splitting coefficient, and is determined based on the power configuration information).

A difference from the implementation 1 lies in that, in the implementation 2, a first splitting coefficient corresponding to each uniform optical splitter is determined by equally splitting pump light of a corresponding wavelength, and the second splitting coefficient is determined based on the power configuration information.

For example, a pump power of an optical multiplexer 1 is $a_1P_{\lambda 1}+a_2P_{\lambda 2}+$ . . . $a_MP_{\lambda M}$, where $a_iP_{\lambda i}$ is a pump power corresponding to a wavelength $\lambda_i$ after optical splitting, . . . , and a pump power of an optical multiplexer N is $k_1 P_{\lambda 1} + k_2 P_{\lambda 2} + \ldots k_M P_{\lambda M}$. Correspondingly, a second splitting coefficient corresponding to the optical multiplexer 1 is $(a_1, a_2, \ldots, a_M), \ldots$, and a second splitting coefficient corresponding to the optical multiplexer N is $(k_1, k_2, \ldots, k_M)$.

In the implementation 2, optionally, the N optical multiplexers implement the second splitting coefficient by using a wavelength selective switch or an optical cross-connect device.

Figure 5:
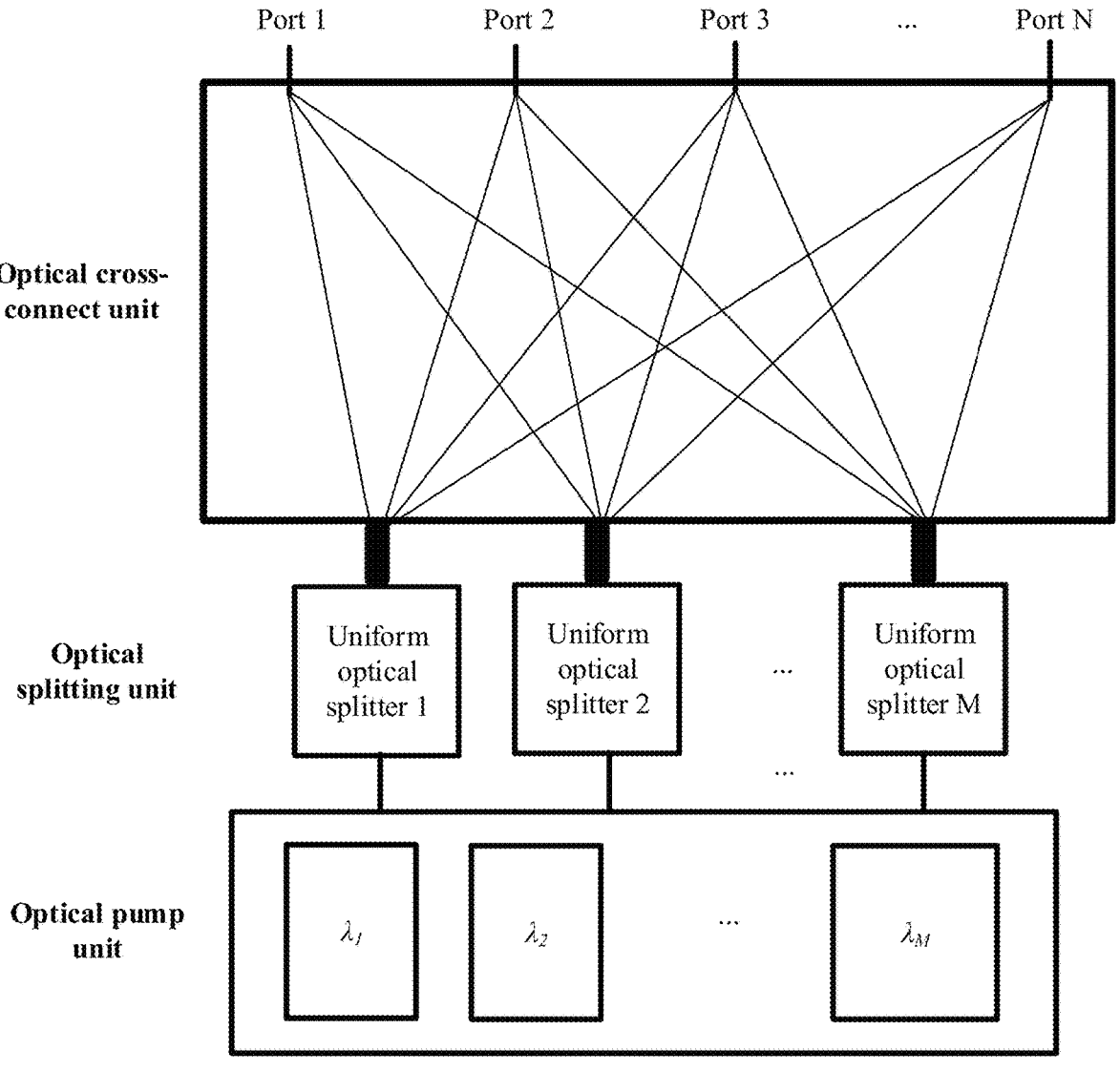
FIG. 5 is another example diagram of a pump control module according to an embodiment of this application.

For ease of understanding, the pump control module corresponding to the implementation 2 is described herein with reference to FIG. 5. For ease of description, an optical pump unit, an optical splitting unit, and an optical cross-connect unit are introduced herein. As shown in FIG. 5, the pump control module includes three parts: the optical pump unit, the optical splitting unit, and the optical cross-connect unit. The optical pump unit includes M pump lasers of the different wavelengths $(\lambda_1, \lambda_2, \ldots, \lambda_M)$. The optical splitting unit includes M uniform optical splitters, where each optical splitter splits a power of one piece of pump light of a specific wavelength into n equal parts $(P_{\lambda 1}/n, P_{\lambda 2}/n, \ldots, P_{\lambda M}/n)$. In other words, the first splitting coefficient is $1/n$. The optical cross-connect unit has N output ports. The optical cross-connect unit cross-connects split optical signals by using the wavelength selective switch or the optical cross-connect device, flexibly adjusts a proportion of each wavelength component, performs optical multiplexing, and finally outputs the weighted N channels of light as pump light in different modes. Pump light of an output port 1 of the optical cross-connect unit is $a_1 P_{\lambda 1} + a_2 P_{\lambda 2} + \ldots a_M P_{\lambda M}, \ldots$, and pump light of an output port N of the optical cross-connect unit is $k_1 P_{\lambda 1} + k_2 P_{\lambda 2} + \ldots k_M P_{\lambda M}$, where $a_1, a_2, \ldots, a_M, \ldots, k_1, k_2, \ldots$, and $k_M$ are different splitting coefficients. In other words, the optical cross-connect unit may be considered as N optical multiplexers, where each optical multiplexer corresponds to one output port of the optical cross-connect unit.

Implementation 3:

The implementation 3 is an implementation combining the foregoing two implementations. Both the first splitting coefficient and the second splitting coefficient are determined based on the power configuration information. In other words, in the implementation 3, a function of the power configuration information is embodied in both the optical splitter and the optical multiplexer.

The pump control module allocates, by using a tunable optical splitter, a pump light power of a corresponding wavelength to N output ports of the tunable optical splitter based on the first splitting coefficient (where the first splitting coefficient is not obtained through equal splitting), and performs beam combining at the optical multiplexer based on the second splitting coefficient (where a value of the second splitting coefficient is not 1), to finally output the N channels of pump light. Certainly, the N channels of pump light herein may also be represented as $a_1 P_{\lambda 1} + a_2 P_{\lambda 2} + \ldots a_M P_{\lambda M}, \ldots$, and $k_1 P_{\lambda 1} + k_2 P_{\lambda 2} + \ldots k_M P_{\lambda M}$.

Through the foregoing three implementations, the pump control module can dynamically adjust gains of different channels in different spatial dimensions, to compensate for a DMG generated after signal light passes through an EDFA, thereby implementing gain equalization of different channels in different spatial dimensions.

The Raman amplification module 230 is configured to perform, by using the N channels of pump light obtained from the pump control module 220, Raman amplification on signal light transmitted in an optical fiber. The following describes the Raman amplification module 230.

Figure 6:
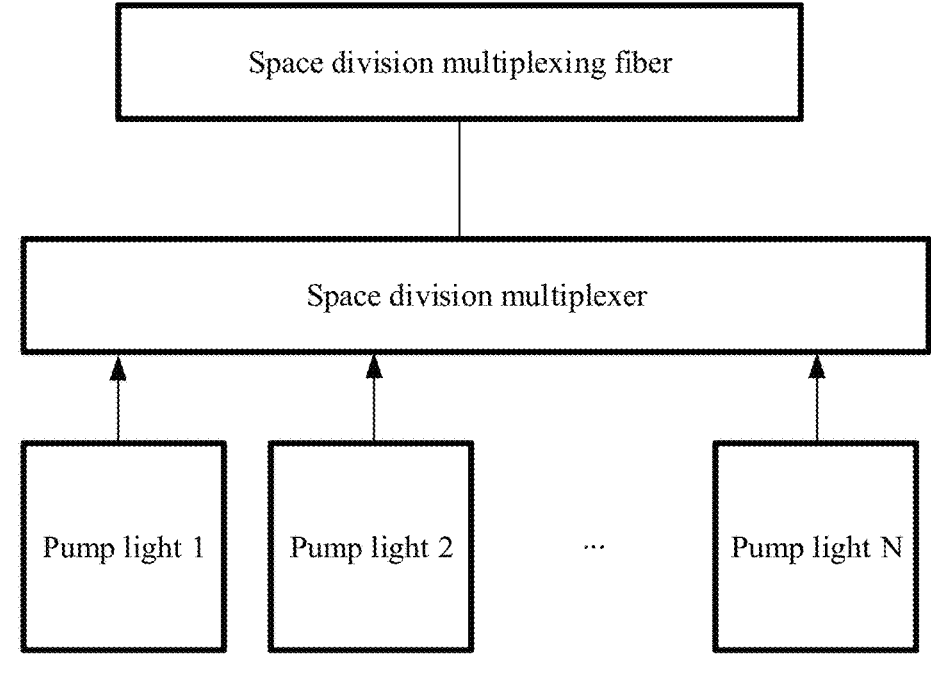
FIG. 6 is an example diagram of a Raman amplification module according to an embodiment of this application.

Optionally, the Raman amplification module 230 includes a space division multiplexer and a space division multiplexing fiber. The N channels of pump light are coupled to the space division multiplexing fiber through the space division multiplexer, and the space division multiplexed signal transmitted in the space division multiplexing fiber undergoes stimulated Raman amplification under the action of the N channels of pump light. FIG. 6 is an example diagram of a Raman amplification module according to an embodiment of this application. As shown in FIG. 6, the N channels of pump light output by the pump control module are coupled into the space division multiplexing fiber through the space division multiplexer, and the space division multiplexed signal transmitted in the optical fiber is subjected to the pump light, thereby generating stimulated Raman amplification. The splitting coefficients $(a_1, a_2, \ldots, a_M, \ldots, k_1, k_2, \ldots, k_M)$ corresponding to the N channels of pump light are adjustable (that is, the pump control module performs adjustment based on the power configuration information), to implement a power equalization between spatial wavelength channels.

The space division multiplexer in this embodiment of this application may be a mode multiplexer, a fiber core multiplexer, or a multiplexer in another dimension. This is not specifically limited.

The optical signal amplification apparatus in embodiments of this application may be applied to a plurality of types of optical communications systems, for example, a single-mode fiber transmission system, a few-mode fiber transmission system, and a multimode fiber transmission system, and is applicable to a comparatively wide range of scenarios.

Figure 7:
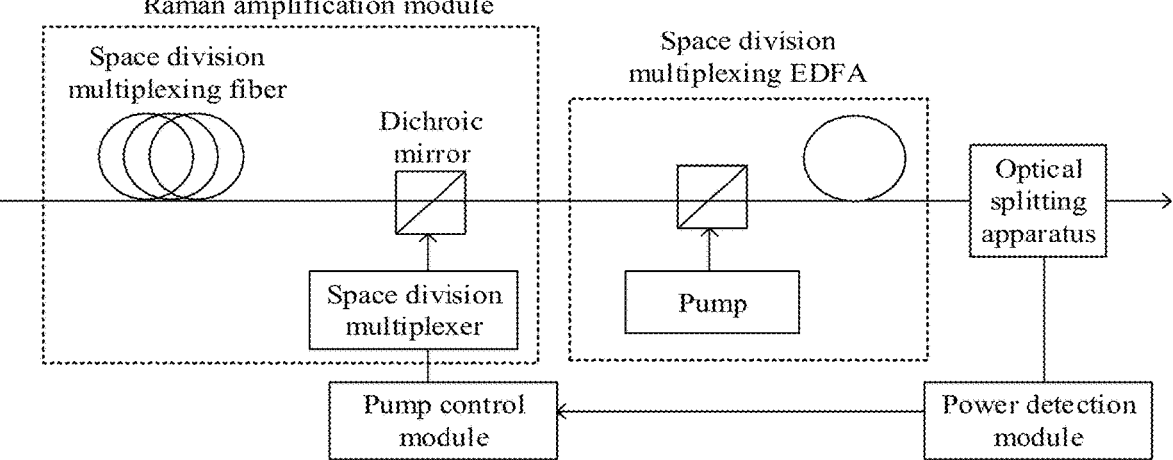
FIG. 7 is a schematic diagram of a structure of a hybrid Raman/EDFA space division multiplexing fiber amplifier according to an embodiment of this application.

In a possible implementation, the optical signal amplification apparatus in this application may be cascaded with and used in combination with a space division multiplexing EDFA. FIG. 7 is a schematic diagram of a structure of a hybrid Raman/EDFA space division multiplexing fiber amplifier according to an embodiment of this application. As shown in FIG. 7, the structure includes a power detection module, a pump control module, a Raman amplification module (which includes a space division multiplexing fiber and a space division multiplexer, and optionally, may further include a dichroic mirror), a space division multiplexing EDFA, and an optical splitting apparatus. In FIG. 7, pump light is coupled to the space division multiplexing EDFA through one dichroic mirror. A space division multiplexed optical signal amplified by the space division multiplexing EDFA is split by one optical splitting apparatus (for example, a first optical splitter), and partial light obtained through the splitting is transmitted to the power detection module. After obtaining a partial space division multiplexed optical signal from the optical splitting apparatus, the power detection module detects power (power detection information) of each wavelength channel in each spatial dimension, performs calculation on the power detection information to obtain power configuration information, and then feeds back the power configuration information to the pump control module. The pump control module adjusts splitting coefficients of pump light of different wavelengths based on the power configuration information transferred by the power detection module, and outputs N channels of pump light. The Raman amplification module performs beam combining on the N channels of pump light by using the space division multiplexer, and inputs, to the space division multiplexing fiber, pump light obtained through beam combining, to compensate for power unflatness of wavelength channels in each spatial dimension.

In a possible implementation, the optical signal amplification apparatus in this embodiment of this application may be applied to a few-mode fiber transmission system (for example, a few-mode fiber C+L-band transmission system). The optical signal amplification apparatus further includes N phase plates. The N phase plates are disposed between the pump control module and the Raman amplification module. The N phase plates are configured to load, to corresponding modes, the N channels of pump light output by the pump control module, where the N spatial dimensions include N modes. Different modes may be understood as different distributions of light energy.

Figure 8:
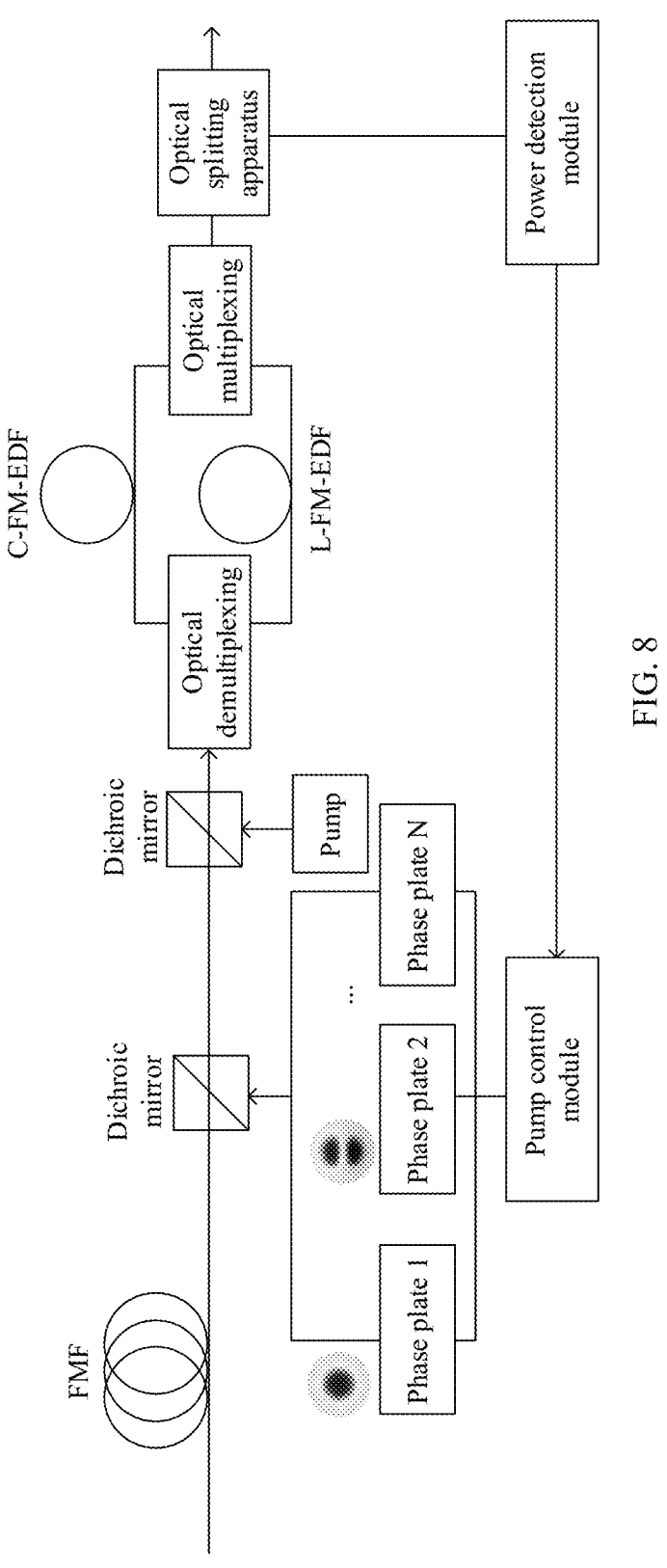
FIG. 8 is a schematic diagram of a structure of a hybrid Raman/EDFA-based C+L-band few-mode fiber amplifier.

With reference to FIG. 8, the following describes an optical signal amplification apparatus applied to a few-mode fiber C+L-band transmission system. FIG. 8 is a schematic diagram of a structure of a hybrid Raman/EDFA-based C+L-band few-mode fiber amplifier. As shown in FIG. 8, the fiber amplifier includes a few-mode fiber FMF, two dichroic mirrors, a C-band and L-band few-mode fiber amplifier EDFA structure (which specifically includes a C-band few-mode erbium-doped fiber (C-FM-EDF) and an L-band few-mode erbium-doped fiber (L-FM-EDF), an optical demultiplexing apparatus, and an optical multiplexing apparatus), an optical splitting apparatus (for example, a first optical splitter), a power detection module, a pump control module, and N phase plates. The N phase plates, the few-mode fiber FMF, and the dichroic mirror may constitute a Raman amplification module. In FIG. 8, a pump light source (which may be specifically a pump laser, for example, a 980 nm pump laser) pumps a few-mode EDFA. Pump light generated by the pump light source is coupled to C-band and L-band few-mode EDFAs through the dichroic mirror. Because structures of the C-band and L-band few-mode EDFAs are different, to implement C+L-band broadband gain amplification, optical demultiplexing may be performed on signal light, and then signal light obtained through the optical demultiplexing is respectively amplified by the few-mode EDFAs of corresponding bands (namely, the C-FM-EDF and the L-FM-EDF). Through the optical multiplexing apparatus, optical multiplexing is performed on signal light amplified by the C-band and L-band few-mode EDFAs. Signal light obtained through optical multiplexing is split by the optical splitting apparatus, and partial signal light obtained through the splitting is transmitted to the power detection module. The power detection module detects a power status (or a gain status) of each wavelength channel in each mode, determines power configuration information (or gain information), and finally feeds back the configuration information to the pump control module. The pump control module performs power adjustment, that is, adjusts ratios (or splitting coefficients) of pump light at different wavelengths, based on the power configuration information sent by the power detection module. The pump control module outputs N channels of pump light. The N channels of pump light are loaded to corresponding N modes by using the N phase plates. Different phase plates correspond to different modes. It can be learned from FIG. 8 that different modes correspond to different light energy distributions (or cross-sections). Beam combining is performed on pump light in each mode, and then pump light obtained through the beam combining is injected into the few-mode fiber FMF through the dichroic mirrors, thereby pumping the FMF, to implement Raman amplification. The hybrid Raman/EDFA-based C+L-band few-mode fiber amplifier in FIG. 8 can implement Raman amplification for the C and L bands at the same time, and can compensate for gains at different channels in different FM-EDFA modes, thereby implementing mode channel equalization for the C and L bands.

It can be understood that the structure in FIG. 8 is merely an example for description, and this application is not limited thereto. For example, some components in FIG. 8 may be properly replaced with other components.

In a possible implementation, the optical signal amplification apparatus in this embodiment of this application may be applied to a multi-core fiber transmission system. The optical signal amplification apparatus further includes a multi-core fan-in module. The multi-core fan-in module is disposed between the pump control module and the Raman amplification module. The multi-core fan-in module is configured to inject, into corresponding fiber cores, the N channels of pump light output by the pump control module, where the N spatial dimensions include N fiber cores.

Figure 9:
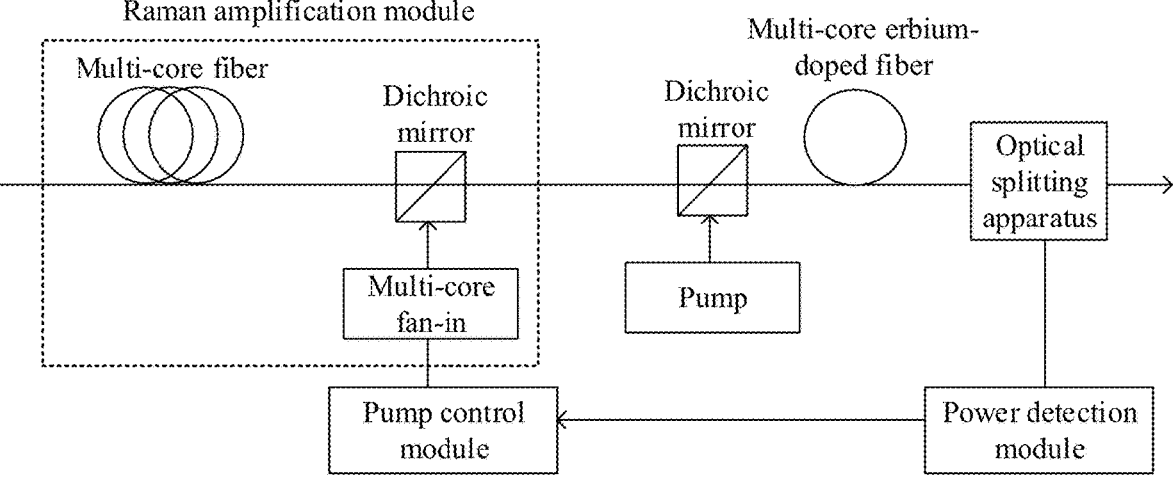
FIG. 9 is a schematic diagram of a structure of an optical fiber amplifier based on a multi-core fiber transmission system.

With reference to FIG. 9, the following describes an optical signal amplification apparatus applied to a multi-core fiber transmission system. FIG. 9 is a schematic diagram of a structure of an optical fiber amplifier based on a multi-core fiber transmission system. As shown in FIG. 9, the optical fiber amplifier includes a multi-core fiber, two dichroic mirrors, a pump (which may be specifically a pump laser, for example, a 980 nm pump laser), a multi-core erbium-doped fiber amplifier EDFA (which includes a multi-core erbium-doped fiber), an optical splitting apparatus, a power detection module, a pump control module, and a multi-core fan-in module. The multi-core fan-in module, the multi-core fiber, and the dichroic mirror may constitute a Raman amplification module. Pump light generated by the pump laser is used as an example. The pump light is coupled to the multi-core EDFA through one dichroic mirror. The multi-core EDFA amplifies signal light. Signal light obtained through gain amplification by the multi-core EDFA is split by one optical splitting apparatus, and partial signal light obtained through the splitting is transmitted to the power detection module. After receiving the partial signal light transmitted by the optical splitting apparatus, the power detection module detects power of each wavelength channel of each fiber core to obtain power detection information, determines power configuration information based on the power detection information, and finally feeds back the power configuration information to the pump control module. The pump control module adjusts a pump light configuration based on the power configuration information fed back by the power detection module, and outputs N channels of pump light. The Raman amplification module injects the N channels of pump light into corresponding fiber cores through the multi-core fan-in module and a dichroic mirror apparatus, to perform Raman amplification on signal light transmitted in the corresponding fiber cores. The optical fiber amplifier in FIG. 9 can implement multi-core channel equalization by compensating for gains at different channels of different fiber cores in the multi-core EDFA.

It can be understood that the structure in FIG. 9 is merely an example for description, and this application is not limited thereto. For example, some components in FIG. 9 may be properly replaced with other components.

It can be further understood that the examples in FIG. 7 to FIG. 9 in embodiments of this application are merely intended to help a person skilled in the art understand embodiments of this application, but are not intended to limit embodiments of this application to specific scenarios in the examples. A person skilled in the art may make various equivalent modifications or changes based on the examples in FIG. 7 to FIG. 9, and such modifications or changes also fall within the scope of embodiments of this application.

Figure 10:
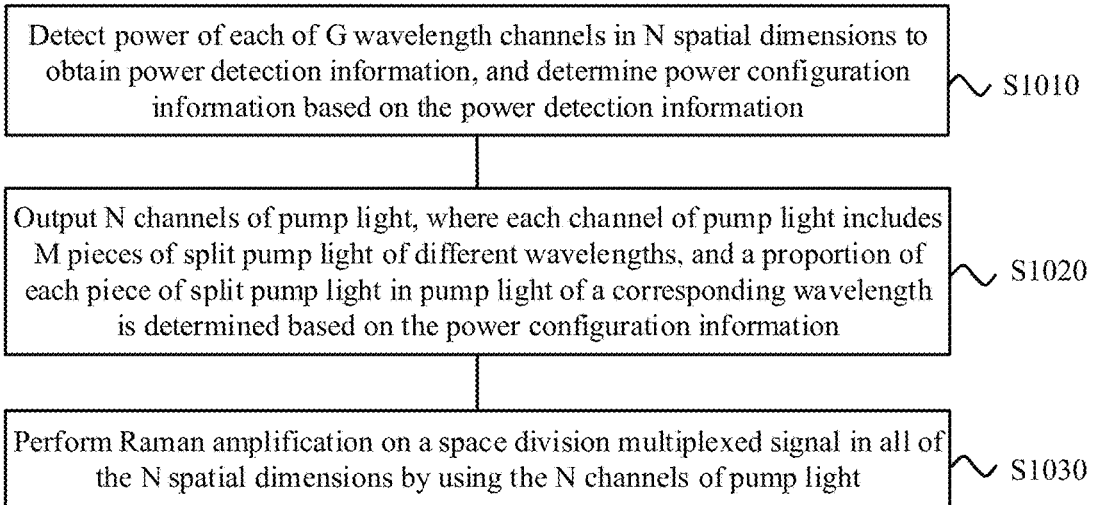
FIG. 10 is a schematic flowchart of an optical signal amplification method according to an embodiment of this application.

Based on the foregoing optical signal amplification apparatus, this application further provides an optical signal amplification method. FIG. 10 is a schematic flowchart of an optical signal amplification method 1000 according to an embodiment of this application. The optical signal amplification method 1000 is performed by an optical signal amplification apparatus. The optical signal amplification apparatus is applied to a space division multiplexing transmission system. A to-be-detected space division multiplexed signal in the space division multiplexing transmission system includes N spatial dimensions, and each spatial dimension includes G wavelength channels, where N is a positive integer, and G is a positive integer. The method 1000 includes the following steps:

S1010: Detect power of each of the G wavelength channels in each of the N spatial dimensions to obtain power detection information, and determine power configuration information based on the power detection information.

S1020: Output N channels of pump light, where each channel of pump light includes M pieces of split pump light of different wavelengths, a proportion of each piece of split pump light in pump light of a corresponding wavelength is determined based on the power configuration information, and M is an integer greater than 1.

S1030: Perform Raman amplification on the space division multiplexed signal in all of the N spatial dimensions by using the N channels of pump light.

Optionally, the M pieces of split pump light in each channel of pump light are obtained through beam combining based on a second splitting coefficient, and each piece of split pump light is obtained by splitting pump light of a corresponding wavelength based on a first splitting coefficient. The first splitting coefficient and/or the second splitting coefficient are/is determined based on the power configuration information.

The first splitting coefficient and the second splitting coefficient depend on a specific implementation of the pump control module in the foregoing optical signal amplification apparatus. For details, refer to the foregoing descriptions of the optical signal amplification apparatus.

Optionally, the determining power configuration information based on the power detection information includes: determining the power configuration information based on the power detection information according to a power flatness criterion.

This application further provides a computer-readable storage medium configured to store a computer program. The computer program includes instructions used to perform the foregoing optical signal amplification method.

It can be clearly understood by a person skilled in the art that, for ease and brevity of description, the steps of the foregoing described method may be performed based on corresponding modules, units, and components in the foregoing product embodiments, and details are not described herein again.

It should be understood that various numbers used in this specification are merely intended for differentiation for ease of description, but are not intended to limit the scope of this application.

It can be understood that some optional features in embodiments of this application may be independently implemented in some scenarios without relying on another feature, for example, a solution on which the optional features are currently based, to resolve a corresponding technical problem and achieve a corresponding effect, or may be combined with another feature based on a requirement in some scenarios. Correspondingly, the apparatus provided in embodiments of this application may also correspondingly implement these features or functions. Details are not described herein.

It can be further understood that names of modules in embodiments of this application are merely for ease of description and do not constitute any limitation on embodiments of this application, which is stated herein once for all. Actually, the modules in embodiments of this application may alternatively have other names.

It can be further understood that the solutions in embodiments of this application may be properly combined for use, and explanations or descriptions of terms in embodiments may be mutually referenced or explained in the embodiments. This is not limited.

It can be further understood that sequence numbers of the foregoing processes do not mean execution sequences in various embodiments of this application. The execution sequences of the processes should be determined based on functions and internal logic of the processes. Various numbers or sequence numbers in the foregoing processes are merely for differentiation for ease of description, and shall not constitute any limitation on an implementation process of embodiments of this application. A person of ordinary skill in the art may be aware that units and algorithm steps described as examples with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person of ordinary skill in the art may be aware that units and algorithm steps described as examples with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, division into the units is merely logical function division, and there may be another division manner during actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may be or may not be physically separate, and components displayed as units may be or may not be physical units, and may be located in one position, or may be distributed on a plurality of network units. Some or all of the units may be selected based on an actual requirement to achieve the objectives of the solutions in embodiments.

In addition, functional units in embodiments of this application may be integrated into one processing unit, or each of the units may exist alone physically, or two or more units may be integrated into one unit.

When the function is implemented in a form of a software function unit and is sold or used as an independent product, the function may be stored in a computer-readable storage medium. Based on such an understanding, the technical solutions in this application essentially, or the part contributing to a conventional technology, or a part of the technical solutions may be implemented in a form of a software product. The computer software product is stored in a storage medium, and includes several instructions for instructing a computer device (which may be a personal computer, a server, a network device, or the like) to perform all or some of the steps of the method in embodiments of this application. The foregoing storage medium includes any medium that can store program code, such as a universal serial bus (USB) flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical signal amplification apparatus, applied to a space-division multiplexing (SDM) transmission system, wherein the optical signal amplification apparatus comprises:
   a power detector configured to:
      separately detect, for each of a plurality of N spatial dimensions, power of each of a plurality of G wavelength channels to obtain power detection information; and
      determine power configuration information based on the power detection information;
   an SDM multiplexer configured to generate, in the SDM transmission system, an SDM signal comprising the plurality of N spatial dimensions, wherein each spatial dimension comprises the plurality of G wavelength channels, wherein N is a positive integer, and wherein G is a positive integer;
   a pump controller configured to:
      receive the power configuration information from the power detector;
      output N channels of pump light, wherein each of the N channels includes M pieces of split pump light of different wavelengths, wherein a proportion of each of the M pieces is based on the power configuration information, and wherein M is an integer greater than 1; and
      adjust, for each of the N spatial dimensions, the proportions of the M pieces of split pump light based on the power configuration information; and a Raman amplifier configured to perform Raman amplification on the SDM signal in all of the plurality of N spatial dimensions using the N channels of pump light.

2. The optical signal amplification apparatus of claim 1, wherein the pump controller comprises:
   M pump light sources of different wavelengths and configured to generate the M pieces of split pump light;
   M optical splitters, wherein each optical splitter of the M optical splitters comprises one input port and N output ports; and
   N optical multiplexers configured to output the N channels of pump light, wherein each optical multiplexer of the N optical multiplexers comprises an output port,
   wherein each pump light source of the M pump light sources is connected to the input port of one optical splitter of the M optical splitters,
   wherein the N output ports of each optical splitter of the M optical splitters are connected to one output port in the N optical multiplexers,
   wherein each optical splitter of the M optical splitters is configured to:
      split pump light of a corresponding wavelength based on a first splitting coefficient; and
      output N pieces of split pump light through the N output ports, wherein the N pieces of split pump light arrive at the N optical multiplexers, respectively,
   wherein each optical multiplexer of the N optical multiplexers is configured to perform, based on a second splitting coefficient, beam combining on the M pieces of split pump light obtained from the M optical splitters in order to obtain one channel of pump light, and
   wherein at least one of the first splitting coefficient or the second splitting coefficient is determined based on the power configuration information.

3. The optical signal amplification apparatus of claim 2, wherein the M optical splitters are tunable optical splitters, and wherein the first splitting coefficient corresponding to each tunable optical splitter is based on the power configuration information.

4. The optical signal amplification apparatus of claim 2, wherein the M optical splitters are uniform optical splitters, wherein the first splitting coefficient corresponding to each uniform optical splitter is based on equally splitting pump light of a corresponding wavelength, and wherein the second splitting coefficient is based on the power configuration information.

5. The optical signal amplification apparatus of claim 4, wherein the N optical multiplexers are configured to implement the second splitting coefficient by using a wavelength selective switch or an optical cross-connect device.

6. The optical signal amplification apparatus of claim 1, wherein the power detector is further configured to determine the power configuration information based on the power detection information by determining the power configuration information based on the power detection information according to a power flatness criterion.

7. The optical signal amplification apparatus of claim 1, wherein the power detector comprises:
   a spatial channel separator configured to separate the SDM signal in the plurality of N spatial dimensions; and
   a wavelength channel power detector configured to:
      separate the plurality of G wavelength channels in each spatial dimension; and
      detect a power of each wavelength channel.

8. The optical signal amplification apparatus of claim 1, further comprising a first optical splitter configured to separate the SDM signal from an SDM fiber link, wherein the first optical splitter is connected to the power detector.

9. The optical signal amplification apparatus of claim 1, wherein the Raman amplifier comprises:

an SDM fiber configured to:

transmit the SDM signal; and stimulate Raman amplification on the SDM signal in response to the N channels of pump light; and an SDM configured to couple the N channels of pump light to the SDM fiber.

10. The optical signal amplification apparatus of claim 1, wherein the optical signal amplification apparatus is applied to a few-mode fiber transmission system, wherein the optical signal amplification apparatus further comprises N phase plates disposed between the pump controller and the Raman amplifier, wherein the N phase plates are configured to load, to corresponding modes, the N channels of pump light output by the pump controller, and wherein the N spatial dimensions are N modes.

11. The optical signal amplification apparatus of claim 1, wherein the optical signal amplification apparatus is applied to a multi-core fiber transmission system, wherein the optical signal amplification apparatus further comprises a multi-core fan-in module disposed between the pump controller and the Raman amplifier, wherein the multi-core fan-in module is configured to inject, into corresponding fiber cores, the N channels of pump light output by the pump controller, and wherein the N spatial dimensions are N fiber cores.

12. An optical signal amplification method comprising:

separately detecting, for each of a plurality of N spatial dimensions, power of each of a plurality of G wavelength channels to obtain power detection information;

generating, in a space-division multiplexed (SDM) transmission system, an SDM signal comprising the plurality of N spatial dimensions, wherein each spatial dimension comprises the plurality of G wavelength channels, wherein N is a positive integer, and wherein G is a positive integer;

determining power configuration information based on the power detection information;

outputting N channels of pump light, wherein each of the N channels includes M pieces of split pump light of different wavelengths, and wherein a proportion of each of the M pieces is based on the power configuration information;

adjusting, for each of the N spatial dimensions, the proportions of the M pieces of split pump light based on the power configuration information; and performing Raman amplification on the SDM signal in all of the N spatial dimensions using the N channels of pump light.

13. The optical signal amplification method of claim 12, further comprising:

obtaining the M pieces of split pump light in each channel of pump light through beam combining based on a second splitting coefficient; and obtaining each piece of split pump light by splitting pump light of a corresponding wavelength based on a first splitting coefficient, wherein at least one of the first splitting coefficient or the second splitting coefficient is based on the power configuration information.

14. The optical signal amplification method of claim 13, wherein determining the power configuration information based on the power detection information comprises determining the power configuration information according to a power flatness criterion.

15. The optical signal amplification method of claim 12, wherein the method is applied to a few-mode fiber transmission system and further comprises loading the N channels of pump light to corresponding modes, where the N spatial dimensions are N modes.

16. The optical signal amplification method of claim 12, wherein the method is applied to a multi-core fiber transmission system and further comprises injecting the N channels of pump light into corresponding fiber cores, wherein the N spatial dimensions are N fiber cores.

17. A non-transitory computer-readable storage medium comprising computer-executable instructions that, when executed by a processor, cause an apparatus to:

separately detect, for each of a plurality of N spatial dimensions, power of each of a plurality of G wavelength channels to obtain power detection information;

generate, in a space-division multiplexing (SDM) transmission system, an SDM signal comprising the plurality of N spatial dimensions, wherein each spatial dimension comprises the plurality of G wavelength channels, wherein N is a positive integer, and wherein G is a positive integer;

determine power configuration information based on the power detection information;

output N channels of pump light, wherein each of the N channels includes M pieces of split pump light of different wavelengths, and wherein a proportion of each of the M pieces is based on the power configuration information;

adjust, for each of the N spatial dimensions, the proportions of the M pieces of split pump light based on the power configuration information; and perform Raman amplification on the SDM signal in all of the N spatial dimensions using the N channels of pump light.

18. The non-transitory computer-readable storage medium of claim 17, wherein the instructions, when executed by the processor, further cause the apparatus to:

obtain the M pieces of split pump light in each channel of pump light through beam combining based on a second splitting coefficient; and obtain each piece of split pump light by splitting pump light of a corresponding wavelength based on a first splitting coefficient, wherein at least one of the first splitting coefficient or the second splitting coefficient is based on the power configuration information.

19. The non-transitory computer-readable storage medium of claim 18, wherein the instructions further cause the apparatus to determine the power configuration information based on the power detection information comprises the instructions further cause the apparatus to determine the power configuration information according to a power flatness criterion.

20. The non-transitory computer-readable storage medium of claim 17, wherein the instructions are applied to a few-mode fiber transmission system wherein the instructions further cause the apparatus to load the N channels of pump light to corresponding modes, and wherein the N spatial dimensions are N modes.

* * * * *